United States Patent Office 3,210,408
Patented Oct. 5, 1965

3,210,408
PROCESSES FOR THE PRODUCTION OF
UNSATURATED ESTERS
Kurt Bauer and Jürgen Pelz, Holzminden, Germany, assignors to Haarmann & Reimer G.m.b.H., Holzminden, Germany, a corporation of Germany
No Drawing. Filed Mar. 30, 1962, Ser. No. 183,739
Claims priority, application Germany, Apr. 5, 1961, H 42,206
7 Claims. (Cl. 260—489)

This invention relates to esters of unsaturated alcohols and to a process for their production.

It is an object of the present invention to provide a new process for the production of esters of unsaturated alcohols. Another object is to provide a new process for the production of compounds which can be used as perfumes or constituents of perfumes. Still another object is to provide a new process for the production of compounds which can be used for the production of certain vitamins.

It has been found that esters of unsaturated alcohols can be obtained by reacting esters of unsaturated alcohols having the general formula $$R_1-\underset{\underset{R_2}{|}}{C}=CH-CH_2-X$$

in which X represents an ester radical and $R_1$ represents a hydrogen atom or a primary or secondary hydrocarbon radical and $R_2$ represents a primary or secondary hydrocarbon radical or a phenyl radical, in the presence of Friedel-Crafts catalysts with aliphatic or cycloaliphatic olefins which may or may not be substituted.

Examples of the hydrocarbon radicals are 4-methylpenten-3-yl and 4,8-dimethylnonadien-3,7-yl, 4-methyl-3-pentenyl, and 4,8-dimethyl-3,7-nonadienyl radicals. The ester radicals may be, for example, acetoxy, propionoxy, butyryloxy, or benzoyloxy radicals. Examples of esters of formula 1 are α,α-dimethylallyl acetate (prenyl acetate), crotyl acetate and cinnamyl acetate.

Unsaturated compounds such as aliphatic and cycloaliphatic olefins which may be reacted with the ester of unsaturated alcohols in accordance with the process of the present invention may contain such substituents as, for example, acyloxy, alkoxy, hydroxy and nitro radicals. Examples of such compounds are olefins such as may be used for the Prins reaction, such as isobutene, styrene, α-methylstyrene, anethole (1-methoxy-4-propenylbenzene), isosafrole (1,2-methylenedioxy-4-propenylbenzene), limonene, cyclohexene, propylene, isoprene, and butadiene. If the olefin compounds contain ester groups then compounds conforming to the foregoing formula, for example, prenyl acetate, or other unsaturated esters, such as methallyl acetate (2-methylallyl acetate), 3-methyl-3-butenyl acetate, or 2-methyl-1-butenyl acetate may be used as the other reactant.

Examples of Friedel-Crafts catalysts which may be used in accordance with the invention are phosphoric acid, pyrophosphoric acid, dichloroacetic acid, perchloric acid, sulfuric acid, boron trifluoride, and the complex of boron trifluoride and 2 mols of acetic acid (BF₃·2CH₃COOH)

called boron trifluoride diacetate herein and boron trifluoride etherate (BF₃·O(C₂H₅)₂), zinc chloride, and p-toluenesulfonic acid. It may easily be established by a preliminary experiment which catalyst is most suitable in each particular case. These catalysts are known to be distinguished by the fact that they promote the formation of carbonium ions. The catalysts are added in general in amounts which are usual for these catalysts preferably of about 1 to 20 weight percent based on the reactants, but it might be advisable in some cases to add them in greater or lesser amounts.

The process may be carried out either in the presence or in the absence of inert solvents such as acetic acid esters. If the olefin that is used is not an ester, then it may be advisable to use a stoichiometric excess of the olefin or to add the ester portionwise as the reaction proceeds to avoid the formation of by-products. The reaction temperature preferably lies within the range of about −10° to 75° C.

The process of the invention is described hereinafter with reference to the following reaction sequences: prenyl acetate and isobutylene are reacted in Equation I, whilst 2 mols of prenyl acetate are reacted together in Equation II.

I)
$$CH_3-\underset{\underset{CH_3}{|}}{C}=CH-CH_2OCOCH_3 + CH_2=\underset{\underset{CH_3}{|}}{C}-CH_3 \xrightarrow{BF_3}$$
$$CH_3-\underset{\underset{CH_3}{|}}{C}=CH-CH_2-CH-\underset{\underset{OCOCH_3}{|}}{\overset{\overset{CH_3}{|}}{C}}-CH_3$$

(II)
$$2CH_3-\underset{\underset{CH_3}{|}}{C}=CH-CH_2OCOCH_3 \xrightarrow{BF_3}$$
$$CH_3-\underset{\underset{CH_2OCOCH_3}{|}}{C}=CH-CH_2-CH-\underset{\underset{OCOCH_3}{|}}{\overset{\overset{CH_3}{|}}{C}}-CH_3$$

A prenyl ion is probably first formed in the reaction, and this then reacts with the olefin and is stabilized by taking up an acyloxy radical. As a competitive reaction, the stabilization may in some cases be effected by giving up a proton, so that a by-product with an additional double bond is formed. The formation of the ester is obviously favored at lower temperatures. The reaction probably proceeds in the sequence of steps indicated hereinafter in the case of the reaction of 2 molecules of prenyl acetate.

$$CH_3-\underset{\underset{CH_3}{|}}{C}=CH-CH_2OCOCH_3 + BF_3 \longrightarrow$$
$$\left[CH_3-\underset{\underset{CH_3}{|}}{C}=CH-CH_2\right]^+ + [BF_3\cdot CH_3COO]^-$$

$$\left[CH_3-\underset{\underset{CH_3}{|}}{C}=CH-CH_2\right]^+ + \underset{\underset{CH_2OCOCH_3}{|}}{CH}=\underset{\underset{}{|}}{\overset{\overset{CH_3}{|}}{C}}-CH_3 \longrightarrow$$

$$\left[CH_3-\underset{\underset{CH_3}{|}}{C}=CH-CH_2-CH-\underset{\underset{CH_2OCOCH_3}{|}}{\overset{\overset{CH_3}{|}}{C}}-CH_3\right]^+$$

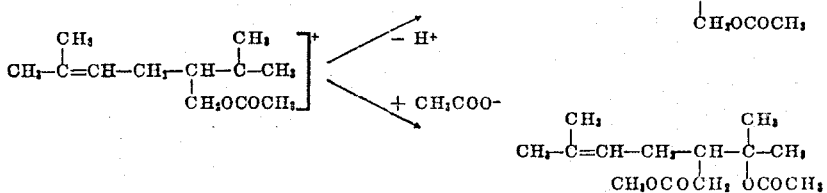

The compounds obtained in accordance with the invention may either be used directly as perfumes or as intermediate products, for example, for the manufacture of perfumes and vitamins.

Example 1

240 grams of isobutylene are reacted at −20° C. with 128 grams of 2-methyl-2-butenyl acetate in a round-bottomed 1-liter flask provided with stirrer and external cooling means. 20 grams of boron trifluoride diacetate ($BF_3 \cdot 2CH_3COOH$) are added to this mixture dropwise over 20 minutes at −5° C. while keeping the mixture stirred. The mixture was then left to stand for 4 hours at −5° C. The temperature was then raised to about 0° C., 150 cc. of water was added and unconverted isobutylene was distilled off. The residue was washed three times with 100 cc. portions of water and subjected to fractional distillation, whereby 52 grams of prenyl acetate and 53 grams of 2,6-dimethyl-2-heptenyl acetate, boiling point 76° C. at 5 mm. Hg, were obtained. In addition, 33 grams of higher boiling constituents including residue were obtained.

Example 2

512 grams of anhydrous 2-methyl-2-butenyl acetate (prenyl acetate) were placed in a 1-liter round-bottomed flask provided with stirrer and external cooling means, and 30 grams of boron trifluoride diacetate were added dropwise over 20 minutes at 20° C. with stirring. After adding the whole quantity of catalyst, the mixture was left to stand for 3 hours at 20° C.

After the addition of 150 cc. of 10% sodium chloride solution, the organic phase was separated in a separating funnel, and after shaking 5 times with 100 cc. portions of sodium chloride, it was dried over anhydrous sodium sulfate. In the subsequent fractional distillation of the crude telomer, the following compounds were obtained in addition to 230 grams of recovered prenyl acetate:

(1) 112 grams of oxydihydrolavandulyl diacetate (boiling point at 5 mm. Hg, 126–128° C.)

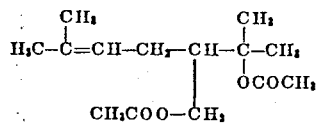

(2) 75 grams of lavandulyl acetate (boiling point at 5 mm. Hg, 85–87° C.)

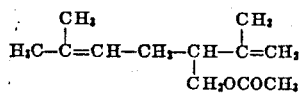

(3) 52 grams of higher boiling substances including residue.

The infra-red spectrum of the saponification product corresponded with that described for lavandulene by W. Kuhn and H. Schinz (Helv. Chim. Acta 35, 2008–2015, 1952).

Like the diacetate of the same formula described by H. Schinz and G. Schaeppi (Helv. Chim. Acta 30, 1483–1494, 1947), this compound could be decomposed without residue at 270° C. into pure lavandulyl acetate and acetic acid.

Example 3

30 grams of boron trifluoride diacetate was added dropwise with stirring over 20 minutes and at 20° C. to 512 grams of 2-methyl-2-butenyl acetate and 512 grams ethyl acetate as diluent in a 2-liter round-bottomed flask provided with stirrer and external cooling means. The mixture was then left to stand for 5 hours at 20° C.

After the addition of 200 cc. of water, the organic phase was separated, washed five times with 150 cc. portions of water, and dried over anhydrous sodium sulfate. The ethyl acetate was distilled off at normal pressure. The subsequent vacuum distillation yielded 82 grams of crude product, boiling point 100° C./15 mm. to 146° C./3 mm., in addition to 390 grams of recovered prenyl acetate.

The following were obtained on redistilling the crude product:

(1) 29 grams of oxydihydrolavandulyl diacetate,
(2) 31 grams of lavandulyl acetate,
(3) 22 grams of higher boiling substances including residue.

Example 4

40 grams of boron trifluoride diacetate were added dropwise with stirring over a period of 8 minutes to 512 grams of 2-methyl-2-butenyl acetate at −10° C. in a 1-liter round-bottomed flask provided with stirrer and external cooling means. After addition of the catalyst, the mixture was left to stand at −10° C. for 2 hours.

100 cc. of water was then added and the organic phase was separated off in a separating funnel. After washing five times with 100 cc. portions of water and drying over sodium sulfate, the subsequent fractional distillation yielded 86 grams of crude product, boiling point 51° C./1.5 mm. to 135° C./1.5 mm., in addition to 365 grams of recovered prenyl acetate.

Redistillation of the crude product gave the following yields:

(1) 69 grams of oxydihydrolavandulyl diacetate,
(2) 5 grams of lavandulyl acetate,
(3) 12 grams of higher boiling substances including residue.

Example 5

512 grams of 2-methyl-2-butenyl acetate were placed in a 1-liter round-bottomed flask provided with stirrer and external cooling means, and 35 cc. of concentrated sulfuric acid was then added dropwise with stirring during a period of 45 minutes at 20° C.

150 cc. of water were added immediately after all the sulfuric acid had been added, and the organic phase was then separated in a separating funnel. After washing three times with 100 cc. portions of 5% $K_2CO_3$ solution and drying over anhydrous sodium sulfate, the product was subjected to fractional distillation. In addition to 280 grams of recovered prenyl acetate, the following were obtained:

(1) 56 grams of oxydihydrolavandulyl diacetate,
(2) 52 grams of lavandulyl acetate,
(3) 68 grams of higher boiling substances including residue.

Example 6

142 grams (1 mol) of 2-methyl-2-butenyl propionate (prenyl propionate) were placed into a 250 cc. round-bottomed flask provided with stirrer and external cooling means, and 10 grams of boron trifluoride diacetate were added dropwise over 20 minutes at 20° C. with stirring. After the catalysts had been added, the mixture was left to stand for 3 hours at 20° C. The reaction was then stopped by the addition of 50 cc. of water. The organic phase was separated off, washed with 50 cc. of water, and dried over anhydrous sodium sulfate. The product was then subjected to fractional distillation at reduced pressure and the following were obtained in addition to 80 grams of prenyl propionate recovered, 6 grams of lavandulyl propionate (boiling point at 5 mm. Hg 98–102°C.),
9 grams of oxydihydrolavandulyl dipropionate,
27 grams of higher boiling substances and residue.

Example 7

280 grams (2.2 mols) of 3-methyl-3-butenyl acetate and 420 grams (3.3 mols) of 2-methyl-2-butenyl acetate (prenyl acetate) were poured as a solution in 200 grams of acetic acid into a round-bottomed flask provided with stirrer and external cooling means, and 30 grams of boron trifluoride diacetate were added dropwise with stirring over 30 minutes at 20° C. The mixture was then left to stand for 2½ hours at 20° C. After the addition of 100 cc. of water, the organic phase was separated off and dried over anhydrous sodium sulfate. By distillation at reduced pressure, the starting material was recovered in addition to the following fractions:

60 grams of terpene acetate,
38 grams of 2,6-dimethyl-2-octene-6,8-diol diacetate (geraniol hydrate diacetate) and acetates of sesquiterpene alcohols,
32 grams of higher boiling substances including residue.

The terpene acetate fraction was found by gas chromatographic analysis to consist of the following:

55% lavandulyl acetate,
15% allo- and isogeranyl acetate,
30% neryl acetate.

Example 8

122 grams (0.95 mol) of 3-methyl-3-butenyl acetate, 85 grams (0.66 mol) of prenyl acetate and 145 grams of ethyl acetate were placed in a round-bottomed flask provided with a stirrer and an external cooling means, and 10 grams of boron trifluoride etherate ($BF_3 \cdot O(C_2H_5)_2$) was added dropwise with stirring over 10 minutes at 25° C. The mixture was then left to stand for 60 minutes at 25° C. The catalyst was then inactivated by the addition of 8 grams of anhydrous sodium carbonate. After filtering off the precipitate, ethyl acetate and unreacted prenyl acetate and 3-methyl-3-butenyl acetate were removed by boiling, and the residue was distilled off at reduced pressure, and the following fractions were obtained:

22 grams of terpene acetate,
33 grams of geraniol hydrate diacetate and higher boiling fractions.

The terpene acetate fraction was found by gas chromatographic analysis to consist of the following:

| | Percent |
|---|---|
| $C_5$-diacetate (2-methylbutane-2,4-diol-diacetate) | 9 |
| Lavandulyl acetate | 25 |
| Allo- and isogeranyl acetate | 28 |
| Neryl acetate | 38 |

Example 9

170 grams (1.33 mols) of 3-methyl-3-butenyl acetate and 42 grams (0.33 mol) of prenyl acetate were diluted with 45 grams of acetic acid in a round-bottomed flask provided with stirrer and external cooling means, and 10 grams of boron trifluoride etherate were added dropwise while stirring over 10 minutes at 25° C. The mixture was then left to stand for 3 hours at 25° C. The catalyst was inactivated by the addition of 8 grams of anhydrous sodium carbonate, the precipitate was filtered off, and the ethyl acetate was removed by evaporation. The residue was fractionally distilled at reduced pressure and the following fractions were obtained:

26 grams of terpene acetate,
29 grams of geraniol hydrate diacetate and higher boiling fractions.

According to gas chromatographic analysis, the terpene acetate fraction contained the following components:

| | Percent |
|---|---|
| $C_5$-diacetate (2-methylbutane-2,4-diol diacetate) | 20 |
| Lavandulyl acetate | 8 |
| Allo- and isogeranyl acetate | 31 |
| Neryl acetate | 41 |

Example 10

205 grams (1.6 mols) of 3-methyl-3-butenyl acetate, 51 grams (0.4 mol) of prenyl acetate and 40 grams of ethyl acetate were placed in a round-bottomed flask, and a solution of 13 grams of boron trifluoride etherate in 20 grams of ethyl acetate were added dropwise over 10 minutes at 60° C. while thoroughly stirring. The mixture was then left to stand for 30 minutes at 60° C. The catalyst was then inactivated by the addition of 12 grams of anhydrous sodium carbonate. After filtering off the precipitate, ethyl acetate and unreacted prenyl 3-methyl-3-butenyl acetate were removed by evaporation, and the residue obtained was distilled off at reduced pressure; the following fractions were obtained:

47 grams of terpene acetate,
32 grams of geraniol hydrate diacetate and higher boiling fraction.

According to gas chromatographic analysis, the terpene acetate fraction consisted of the following:

| | Percent |
|---|---|
| $C_5$-diacetate | 38 |
| Lavandulyl acetate | 4 |
| Allo- and isogeranyl acetate | 28 |
| Neryl acetate | 30 |

Example 11

240 grams (1.88 mols) of 3-methyl-3-butenyl acetate, 30 grams (0.23 mol) of prenyl acetate and 60 grams of ethyl acetate were placed in a round-bottomed flask and a solution of 18 grams of boron trifluoride etherate dissolved in 30 grams of ethyl acetate was added dropwise over 10 minutes at 25° C. while stirring. When all the catalyst had been added, 100 grams of prenyl acetate was added dropwise at a steady rate over 4 hours at 25° C. to the reaction solution. The catalyst was then inactivated by the addition of 17 grams of anhydrous sodium carbonate, the mixture was filtered, acetic acid and unreacted 3-methyl-3-butenyl acetate and prenyl acetate acetates were boiled off, and 120 grams of a crude product were obtained, which yielded the following fractions on distillation at reduced pressure:

49 grams of terpene acetate,
62 grams of geraniol hydrate diacetate and higher boiling fraction.

Gas chromatographic analysis showed that the terpene acetate fraction had the following composition:

| | Percent |
|---|---|
| $C_5$-diacetate (2-methylbutane-2,4-diol-diacetate) | 35 |
| Lavandulyl acetate | 3 |
| Allo- and isogeranyl acetate | 27 |
| Neryl acetate | 35 |

Example 12

204 grams (1.6 mols) of 3-methyl-3-butenyl acetate and 51 grams (0.4 mol) of 2-methyl-2-butenyl acetate were placed in a round-bottomed flask provided with stirrer and external cooling means, and a solution of 30 grams of pyrophosphoric acid in 20 grams of glacial acetic acid was added over a period of 5 minutes at 40° C. The mixture was then left to stand for 2 hours at 40° C. 100 cc. of water were then added and the organic phase which separated out was removed and washed twice with 20 cc. portions of saturated sodium chloride solution. The unreacted starting material (up to boiling point at 10 mm. Hg, 45° C.) was removed by boiling, leaving 75 grams of residue which was saponified with 450 cc. of a 10% methanolic potassium hydroxide solution. 44 grams of saponification product were obtained, which yielded the following fractions on distillation:

1st fraction: Boiling point 70° C./1.4 mm. —92° C./1.5 mm.=27 grams of terpene alcohols.
2nd fraction: Boiling point —135°/1.4 mm.=15 grams.
Residue = 1 gram.

On gas chromatographic analysis, the first fraction was found to consist of the following:

6% lavandulol
6% of unidentified $C_{10}$ alcohol
32% of iso- and allogeraniol
51% nerol
5% of geraniol

Example 13

85 grams (0.45 mol) of 3-methyl-3-butenyl benzoate, 40 grams of ethyl acetate and 6 grams of boron trifluoride etherate were placed in a 250 cc. round-bottomed flask and reacted at 25° C. for one hour with 57 grams (0.45 mol) of 2-methyl-2-butenyl acetate with stirring. The mixture was then left to stand for 45 minutes at 25° C. It was then saponified with 550 grams of a 10% methanolic potassium hydroxide solution. Prenyl acetate and 3-methyl-3-butenyl acetate were distilled from the saponification product. The residue yielded on distillation 11 grams of a terpene alcohol fraction (boiling point at 1.4 mm. 70° to 117° C.) and 7 grams of higher boiling fractions including residue. Gas chromatographic analysis showed the terpene alcohol fraction to consist of the following:

| | Percent |
|---|---|
| Lavandulol | 12 |
| Allo- and isogeraniol | 14 |
| Nerol | 67 |
| Geraniol | 7 |

Example 14

196 grams (1 mol) of 3,7-dimethyl-2,6-octadienyl acetate (geranyl acetate), 128 grams (1 mol) of 3-methyl-3-butenyl acetate and 70 grams of ethyl acetate were placed in a 1-liter round-bottomed flask and a solution of 10 grams of boron trifluoride etherate in 30 grams of acetic acid was added dropwise at 25° C. over 30 minutes. The mixture was then left to stand for 3 hours at 25° C. The catalyst was inactivated by adding a solution of 16 grams of potassium acetate in 30 cc. of glacial acetic acid, and the product was filtered. Ethyl acetate and unreacted 3-methyl-3-butenyl acetate and geranyl acetates were boiled off, and there remained 25 grams of residue and 76 grams of a fraction (B.P. at 1.5 mm. 105° to 170° C.) which on redistillation yielded 46 grams of a $C_{15}$-acetate fraction and 22 grams of higher boiling fractions. The saponification product of the $C_{15}$-acetate fraction (B.P. at 1.5 mm. 118 to 125° C.) was found by gas chromatographic and infra-red absorption spectral analyses to be composed mainly of farnesol. The reaction product can be used in known procedures for the production of phytol and the vitamins E and $K_1$.

Example 15

115 grams (0.9 mol) of 3-methyl-3-butenyl acetate and 77 grams (0.6 mol) of prenyl acetate were placed in a round-bottomed flask. Into this mixture there were added dropwise at 45° C. within 30 minutes a mixture of 30 grams of orthophosphoric acid and 20 grams of ethyl acetate. The mixture was then left to stand for 5 hours at 45° C. Subsequently the crude reaction product was washed three times with saturated sodium chloride solution, thereafter dried with anhydrous sodium sulfate and then distilled at a subatmospheric pressure of 4.5 torr and a temperature of 150° C.

Besides a residue of 1 gram there was obtained 158 grams of a distillate which was subsequently distilled at reduced pressure. The following fractions were obtained:

85 grams of unreacted $C_5$-acetate
56 grams of terpene acetate
12 grams of geraniol hydrate diacetate including acetates of sesquiterpene alcohols
3 grams of higher boiling compounds Gas chromatographic analysis of the terpene fraction revealed it to be consisted of the following:

| | Percent |
|---|---|
| Isoprene-glycol-mono- and -diacetate | 23 |
| Lavandulyl acetate | 7 |
| Cyclogeranyl-acetate | 9 |
| Allo- and isogeranyl acetate | 30 |
| Neryl acetate | 31 |

We claim:
1. A process for the production of an ester of an unsaturated alcohol which comprises reacting together a molecular amount of
   (a) an ester of an unsaturated alcohol, said ester having the general formula

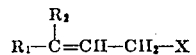

wherein X is an ester group from a carboxylic acid selected from the group consisting of acetic, propionic, butyric and benzoic acid, $R_1$ and $R_2$ being aliphatic hydrocarbon radicals containing up to 12 carbon atoms; with a corresponding reactive molecular amount of
   (b) a member selected from the group consisting of an aliphatic olefin, cycloaliphatic olefin and (a) as above defined, in the presence of an active amount of Friedel-Crafts catalyst; effecting a molecular reaction at a temperature range of about $-10°$ C. to 75° C., and recovering the resulting ester.

2. A process according to claim 1 wherein (a) is prenylacetate, (b) is isopentenylacetate and the catalyst is boron trifluoride diacetate.

3. A process according to claim 1 wherein (a) is geranyl acetate and (b) is isopentenyl acetate, the reaction being effected in the presence of an active amount of ethyl acetate and the catalyst consists of 1 part by weight boron trifluoride etherate in about 3 parts acetic acid.

4. A process according to claim 1 which comprises reacting together in the presence of a Friedel-Crafts catalyst a mixture of geranyl acetate and 3-methyl-3-butenyl acetate and recovering the resulting ester of the unsaturated alcohol.

5. A process according to claim 1 which comprises reacting together in the presence of a Friedel-Crafts catalyst a mixture of 3-methyl-3-butenyl acetate and 3-methyl-2-butenyl acetate.

6. A process as defined in claim 1 in which the Friedel-Crafts catalyst is a complex of boron trifluoride with a compound of the group consisting of acetic acid and ethyl ether.

7. A process for the production of an acetate ester of an alcohol selected from the group consisting of lavandulol and oxydihydrolavandulol comprising treating with prenyl acetate in the presence of an active amount of a Friedel-Crafts catalyst and recovering from the resulting reaction mixture at least one of the corresponding products.

References Cited by the Examiner

UNITED STATES PATENTS

| 2,402,485 | 6/46 | Adelson et al. | 260—488 |
| 2,834,747 | 5/58 | Short et al. | 260—476 |
| 3,021,359 | 2/62 | Kimel et al. | 260—497 |

OTHER REFERENCES

Groggins: "Unit Processes in Organic Synthesis," 3rd edition, published by McGraw-Hill Book Co. Inc., page 720 (1947).

LORRAINE A. WEINBERGER, *Primary Examiner.*

ABRAHAM H. WINKELSTEIN, LEON ZITVER,
*Examiners.*